United States Patent
Baiocchi et al.

[11] Patent Number: 5,975,695
[45] Date of Patent: *Nov. 2, 1999

[54] OPTICAL ELEMENT FOR USE IN EYE-PROTECTING DEVICES

[75] Inventors: Paolo Baiocchi, Parma; Giuseppe Iori, Reggio Emilia; Graziano Marusi, Parma, all of Italy

[73] Assignee: Intercast Europe S.P.A., Parma, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/927,017

[22] Filed: Sep. 10, 1997

[51] Int. Cl.$^6$ .................................................. G02C 7/10
[52] U.S. Cl. .......................... 351/163; 351/44; 359/722
[58] Field of Search ................. 351/159, 160 R, 351/160 H, 161–166, 168–169, 44–45; 359/722; 2/6.3–6.5, 10, 12–13, 15, 426, 432

[56] References Cited

U.S. PATENT DOCUMENTS

| | | | |
|---|---|---|---|
| Re. 16,862 | 1/1928 | Moran et al. | 351/45 |
| D. 208,502 | 9/1967 | Halpern et al. | D16/314 |
| D. 321,896 | 11/1991 | Croll | D16/313 |
| D. 377,802 | 2/1997 | Leonardi | D16/313 |
| 564,894 | 7/1896 | Kokocinski | 351/45 |
| 1,257,667 | 2/1918 | Barr | 351/45 |
| 1,676,760 | 7/1928 | Wilson | 351/45 |
| 1,771,451 | 7/1930 | Suzuki et al. | 351/165 |
| 1,865,691 | 7/1932 | Hill | 65/37 |
| 2,230,009 | 1/1941 | Ordorica | 351/45 |
| 2,334,446 | 11/1943 | Serrell | 351/49 |
| 2,511,776 | 6/1950 | Kelly | 2/432 |
| 3,254,932 | 6/1966 | Blaney | 351/47 |
| 4,338,003 | 7/1982 | Adrian | 351/45 |
| 4,470,673 | 9/1984 | Gilson et al. | 351/44 |
| 4,542,964 | 9/1985 | Gilson | 351/44 |
| 4,678,296 | 7/1987 | Smith | 351/45 |
| 4,915,495 | 4/1990 | Takeuchi | 351/49 |
| 4,961,640 | 10/1990 | Irlen | 351/44 |
| 5,149,183 | 9/1992 | Perrott | 359/885 |
| 5,252,997 | 10/1993 | Christenbery | 351/49 |
| 5,355,182 | 10/1994 | Barbera | 351/45 |
| 5,381,193 | 1/1995 | Wedding | 351/163 |
| 5,428,409 | 6/1995 | Silverstein | 351/45 |
| 5,432,568 | 7/1995 | Batz et al. | 351/45 |
| 5,617,154 | 4/1997 | Hoffman | 351/162 |
| 5,694,240 | 12/1997 | Sternbergh | 359/359 |

FOREIGN PATENT DOCUMENTS

| | | |
|---|---|---|
| 0 382 684 | 2/1989 | European Pat. Off. . |
| 0 382 684 | 1/1990 | European Pat. Off. . |
| 1380785 | 3/1965 | France . |
| 1134220 | 8/1962 | Germany . |
| 1 480 492 | 7/1977 | United Kingdom . |
| WO 85/05701 | 12/1985 | WIPO . |

*Primary Examiner*—Georgia Epps
*Assistant Examiner*—Jordan M. Schwartz
*Attorney, Agent, or Firm*—Whitham, Curtis & Whitham

[57] ABSTRACT

An optical element is disclosed comprising an upper portion (9) and a lower portion (8) defined in opposite parts with respect to a median line (x—x) passing through the geometric center ($C_1$, $C_2$) of the optical element, wherein the factor of luminous transmittance is between 30% and 80% in the lower portion (8) and between 3% and 40% in the upper portion (9). Advantageously, furthermore, the curve of spectral transmittance as a function of the wavelength in the lower portion (8) and at a distance of at least 10 mm from the median line (x—x) is such as to show: a minimum in a wavelength range of from 495 to 510 nm, ii) an increase in spectral transmittance at wavelengths lower than 495 nm and higher than 510 nm, iii) a maximum at a wavelength lower than 440 nm, iv) a reduction in the spectral transmittance as the wavelength decreases starting from said maximum.

27 Claims, 6 Drawing Sheets

OPTICAL ELEMENT FOR USE IN EYE-PROTECTING DEVICES

FIELD OF THE INVENTION

In a general aspect, the present invention relates to an optical element for use in eye-protecting devices such as eyeglasses, masks, visors and the like.

More particularly, the invention relates to a transparent element for optical applications comprising an upper portion and a lower portion defined in opposite parts with respect to a median line passing through the geometric center of the optical element.

The optical element of the invention may be either a semi-finished product from which it is possible to obtain by forming and possibly by beveling an ocular for eye-protecting devices, such as for instance a lens of any shape for eyeglasses, or a finished product, such as for instance an ocular in the form of lenses for eyeglasses, either ophthalmic or not, protection masks or portable shields, or in the form of a filter for photographic applications.

The invention also refers to any eye-protecting device comprising said optical element.

In the following description and in the appended claims, the terms: eye-protecting device, and: ocular, are intended to indicate elements suitable respectively to protect the eyes and to allow the vision, as defined by European Standard CEN EN 165.

In the following description and in the appended claims, the term: geometric center, is intended to indicate the intersection of the diagonals of the smallest rectangle having at least one horizontal side and circumscribed to the optical element.

In the following description and in the appended claims, the term: median line of the optical element, is instead intended to indicate a horizontal line passing through the geometric center.

BACKGROUND ART

As is known, in some activities and sports practices the perceptive capacity and, more generally, the vision of an object may be disturbed in the presence of a high relative velocity between the perceiving subject and the object, or in the presence of poorly defined objects and surfaces due to a limited illumino-environmental contrast.

Conversely, in some circumstances, vision may be further disturbed and impaired when it is necessary to focus alternately and repeatedly an object in the presence of an illumino-environmental contrast now limited now high, such as for instance that which exists, respectively, between an object and the ground or an object and the sky that has in itself a markedly higher luminance.

In this regard, some experimental tests carried out by the Applicant in sunny conditions in a varied town environment in the presence of vegetation and at the latitude of about 43° North, have shown that the luminance of the sky may be from 1.5 to about 9 times higher than the luminance of the ground.

In such circumstances, the eye must vary continuously the pupillary diameter, consequently adjusting the exposure of the retina to the external light, to face alternately high and low luminosity conditions.

In spite of the efforts of the eyes to adapt itself to an average situation, which in any case would not allow an optimal vision, this brings about a visual stress that may lead to a visual straining and in some cases also to a partial (even though reversible) damage of the receptors located on the retina.

Such unfavorable phenomenon is always present and particularly marked when playing some sports activities, among which golf or clay-pigeon shooting, in which the athlete or the sportsman repeatedly passes from the observation of objects having a low illumino-environmental contrast or at least that are in a relatively little luminous field (for instance, the golf ball against the background of the green course) to the observation of objects that are in a markedly more luminous field (for instance, the flight of the golf ball against the blue background of the sky after each shot).

Examples of other activities subject to high visual stresses due to the need of perceiving rapidly moving objects include winter sports in general, as well as tourist- or competitive driving of any vehicles, such as for instance, cars or motorcycles, aircrafts, boats, etc.

In order to somehow obviate the problem and to render the vision of moving objects clearer and sharper, it has been proposed the adoption of protective optical elements made of plastics—such as for instance eyeglasses or unitary masks—incorporating a specific substance suitable to filter visible light, as is described in European patent application EP 0 382 684.

Even though the protective optical element disclosed in the aforementioned European patent application can partly compensate for the anomalies due to the limited illumino-environmental contrast, allowing to reduce the perception time of moving objects and to improve the definition of their contour, it does not allow to remedy in any way to the visual stress due to the need of repeatedly take account of different luminance conditions.

SUMMARY OF THE INVENTION

According to the present invention it has now been found that it is possible both to substantially reduce the visual stress and to optimize the capacity of perceiving objects alternately observed against a background having high and respectively low luminosity, by adopting an optical element having predetermined and different spectral characteristics in the lower and upper portions of the same.

According to a first aspect, the present invention provides an optical element of the above indicated type wherein:
  a1) the factor of luminous transmittance is between 30% and 80%;
  a2) the curve of spectral transmittance as a function of the wavelength is such as to show:
    i) a minimum in a wavelength range of from 495 to 510 nm,
    ii) an increase in spectral transmittance at wavelengths lower than 495 nm and higher than 510 nm,
    iii) a maximum at a wavelength lower than 440 nm,
    iv) a reduction in the spectral transmittance as the wavelength decreases starting from said maximum;
  b) in the upper portion and at a distance of at least 10 mm from the median line:
  b1) the factor of luminous transmittance is between 3% and 40%.

In the present description and the appended claims, all distances are measured along the surface of the optical element and according to lines (meridians) perpendicular to the median line defined hereinabove.

Besides, in the following description and in the appended claims the term: spectral transmittance or $\tau(\lambda)$, is intended to indicate the ratio, for a given wavelength (λ), of the spectral radiant flux transmitted by the optical element to the incident spectral radiant flux, according to European Standard CEN EN 165 point 2.123.

Lastly, in the following description and in the appended claims, the term: factor of luminous transmittance or $\tau_v$, is intended to indicate the ratio of the luminous flux let through by the optical element in a wavelength range (λ) of from 380 and 780 nm, to the incident luminous flux in a wavelength range (λ) of from 380 and 780 nm, according to European Standard CEN EN 165 point 2.64.

According to the invention, it has been found that such spectral characteristics can optimize the perceptive capacity both by minimizing the visual stress caused by the observation through the upper portion of the optical element of an object against a background having a high luminosity, and by increasing the stability and definition of the image when an object is observed through the lower portion of the optical element against a background having a low luminosity.

Preferably, the ratio between the factor of luminous transmittance of the lower portion and the factor of luminous transmittance of the upper portion of the optical element is between 1.5 and 7, more preferably between 2.5 and 6.5.

In this way, the optical element of the invention can advantageously drastically reduce the ratio between the sky luminance and the ground luminance, and along therewith, reduce the visual stress ensuing from the repeated alternating observation of objects against backgrounds having a high and, respectively, a low luminance.

Preferably, in the lower portion, the spectral transmittance at said minimum comprised between 495 and 510 nm is between 15% and 25%, while the spectral transmittance at said maximum—preferably reached at a wavelength of about 433 nm—is between 35 and 45%.

Preferably, furthermore, the curve of the spectral transmittance progressively increases below 495 nm until it reaches said maximum at a wavelength lower than 440 nm, without showing further minimums or maximums.

By the same token, the curve of the spectral transmittance as a function of the wavelength preferably progressively increases above 510 nm without showing further minimums or maximums.

In this way, the stability and definition of the image are optimized when an object is observed against a low luminosity background through the lower portion of the optical element.

According to a preferred embodiment, particularly suitable for the manufacture of lenses or visors useful for practicing golf or driving vehicles, the optical element shows:

a) a spectral transmittance of the lower portion at a distance of at least 10 mm from the median line not lower than 85% at a wavelength equal to or higher than 650 nm;

b) a factor of luminous transmittance in the upper portion, measured at a distance of at least 10 mm from the median line, of from 8% to 20%.

According to a first embodiment, the optical element has, at the geometric center, light transmission characteristics substantially identical to those of the lower portion.

In this way, the vision of objects in the presence of a limited illumino-environmental contrast (golf ball on the course, road) at the geometric center of the lens is optimized, while ensuring at the same time an optimum vision of moving objects against a background having high luminance (sky).

According to a second embodiment, particularly adapted for the manufacture of oculars in the form of one-piece lenses or visors suitable for piloting aircrafts, the optical element has, at the median line passing through the geometric center, a factor of luminous transmittance substantially uniform and equal to that of the upper portion (3–40%).

In this way, it is optimized the vision of objects against a dark background (instrumentation), usually at a lower level than the geometric center of the ocular which, on the contrary, must allow an undisturbed vision of objects against a luminous background (sky).

Preferably, in both of the above described embodiments, the factor of luminous transmittance of the upper portion is substantially uniform and progressively decreases moving away from the median line down to a value not lower than 3%.

In the alternative, and for the purpose of imparting particular functional characteristics to the ocular, the factor of luminous transmittance of the whole upper portion may be substantially uniform at any point of the same.

Preferably, the factor of luminous transmittance of the lower portion is substantially uniform starting from a distance of at least 10 mm from the median line or, alternatively, starting from the median line itself.

In this way, the optical element allows to optimize—in both of the embodiments described hereinabove—the effects of reduction in the image perception time and to improve the contour definition of the objects observed in the presence of a limited illumino-environmental contrast.

Preferably, the spectral transmittance of the optical element as a whole is substantially null at a wavelength equal to or lower than 400 nm, so as to prevent that dangerous ultraviolet radiations may harm the eye.

For the purposes of the invention, the optical element is preferably consisting of a substrate made of transparent plastic material or, alternatively, of a transparent inorganic material, such as for instance glass.

The plastic materials of most preferred and advantageous use are those selected from the group comprising: polymethyl methacrylate, polyol-allyl-carbonates, aromatic polycarbonates, polystyrene, cellulose esters, polyacrylates, polyalkylacrylates, polyurethanes, saturated and unsaturated polyesters, transparent polyamides, and mixtures thereof.

Among them, diethylenglycol-bis-allyl-carbonate or CR39®, commonly used for the manufacture of oculars, such as for instance lenses (either ophthalmic or not) for eyeglasses, is preferred.

In the alternative, the optical element may be also made of copolymers of the above polymers with other monomers suitable for the purpose, such as for instance, methylmethacrylate, maleic anhydride, triallyl-cyanide, vinyl acetate, etc.

According to the invention, the above described spectral characteristics of the lower and upper portions of the optical element may be obtained by incorporating therein at least a suitable light-filtering substance or, alternatively, a mixture of light-filtering substances.

Preferably, the spectral characteristics of the lower portion are obtained by incorporating in the polymer matrix of such portion or, alternatively, within a film applied to the same, one ore more substances suitable for filtering visible light and comprising chromophore groups, for instance azobenzene and/or anthraquinone groups.

Among them, the preferred substance are those selected from the group comprising: 4-nitro-2'-methyl-4'-diethanolamino-2-phenoxy-1-hydroxy anthraquinone, 1-amino-2-phenoxy-4-hydroxy anthraquinone, 2-chloro-4-nitro-2'-methyl-4'-(1-cyanoethyl-ethylamino) azobenzene, and mixtures thereof.

Preferably, the spectral characteristics of the upper portion are obtained by incorporating in the polymer matrix of said portion or, alternatively, within a film applied to the same, one ore more substances suitable for filtering visible light and comprising chromophore groups, for instance azobenzene and/or anthraquinone groups such that the resulting factor of luminous transmittance is between 3 and 40%.

Preferably, furthermore, the ratio between the factor of luminous transmittance of the lower and upper portions is between 2.5 and 6.5.

In particular, these substances may include, besides the same light filtering substance used to treat the lower portion, other ones of the same chemical nature, such as for instance those selected from the group comprising: 4-acetylamido-2'-hydroxy-5'-methyl azobenzene, N-(p-hydroxyphenyl)-2,4-nitroaniline, and mixtures thereof, and 1,4-(1-hydroxyethylamino)-5,8-hydroxy anthraquinone, 1-(p-hydroxyethylanilino)-4,5-hydroxy-8-nitro anthraquinone, 1-methylamino-4-hydroxyethylamino anthraquinone, and mixtures thereof.

The aforementioned filtering substances may be incorporated in the polymer matrix of the optical element or, alternatively, within a film applied to the same by means of processes known in the art.

Preferably, the light-filtering substance or the mixture of light-filtering substances suitable to lend the desired spectral characteristics to the lower part of the same are first incorporated in the optical element, for instance by adding such substance or mixture of substances to the polymer material, and then by extruding or molding the latter, to obtain an optical element (sheet, visor, etc.) having a predetermined shape and thickness.

In the alternative, a preliminary molding step of the optical element free from light-filtering substances may be carried out followed afterwards by a subsequent step of introducing within the same the filtering substance or mixture of substances, for instance by means of the well known techniques of thermal transfer either in liquid or in vapor phase.

Advantageously, the technique of thermal transfer in liquid phase may be carried out by first immersing the optical element, for instance made of CR39®, into an aqueous solution including the appropriate filtering substances that are incorporated within the polymer matrix.

Advantageously, the technique of thermal transfer in vapor phase allows to treat only one surface of the optical element, for instance the front one, while imparting to the other surface different properties, for instance by applying a film of an antifogging material.

Preferably, the thermal transfer in vapor phase of the filtering substance or mixture of substances may be performed using the known printing process called "thermal transfer", consisting in impregnating an absorbent paper substrate with the filtering substance, transferring the impregnated substrate onto the optical element, and causing the filtering substance to evaporate in hot air, with ensuing incorporation of the same within the optical element.

At the end of this first treatment step, a subsequent step is carried out in which the filtering substance or mixture of substances suitable to impart the desired characteristics of light transmission to the upper portion are introduced within the latter.

This step may be carried out by means of processes well known in the art, for instance by dipping the upper part of the previously treated optical element in an aqueous solution including appropriate light-filtering substances having chromophore groups adapted to impart the desired transmission curve to the upper portion of the element.

In a preferred embodiment, the optical element is raised from the bath at a pre-fixed speed, so as to vary, section by section, the immersion times and to obtain a shaded off upper portion having a factor of luminous transmittance increasingly lower as one approaches the upper edge of the optical element.

The position of the shading off starting line may be either higher or lower than the median line of the optical element and can be easily determined by those skilled in the art.

In the alternative, it is possible to impart the desired spectral characteristics to the upper portion of the optical element by depositing under vacuum a mirror reflecting layer, possibly shaded off, obtainable according to methods and apparatuses known per se by evaporation of subliming substances, such as for instance a metal selected from the group comprising: chromium, aluminium, titanium, and oxides thereof.

According to the invention, the optical element may be either a semi-finished product from which it is possible to obtain by shaping and, possibly, by beveling an ocular of any shape, or a real finished product, such as for instance an ocular for eye-protecting devices, a filter for photographic applications, etc.

As said above, the term: ocular, is used herein to indicate an element suitable to allow vision, such as for instance a lens for eyeglasses, a visor, a protection mask or a portable screen, according to the provisions of European Standard CEN EN 165.

If the optical element is a finished product, it may be obtained starting from a respective semi-finished product by means of shaping and possibly by beveling operations known per se, or by injection molding.

According to a further aspect, the invention also relates to an eye-protecting device adapted to optimize the capacity of perceiving objects either static or moving relatively to the perceiving subject, and observed alternately against a background having high and respectively low luminosity, and comprising an optical element as described hereinabove.

According to a first embodiment, such eye-protecting device is essentially constituted by eyeglasses comprising a supporting frame wherein a couple of lens-shaped oculars are mounted.

The lens-shaped oculars may be ophthalmic lenses, i.e. capable of correcting sight defects, or devoid of any corrective capacity.

According to a second embodiment, such eye-protecting device comprises an ocular in the form of a one-piece visor or unitary lens, comprising an upper edge, a lower edge, as well as first and second lens portions, formed on opposite parts of a groove centrally formed in said lower edge.

BRIEF DESCRIPTION OF THE DRAWINGS

Further characteristics and advantages of the invention will become more readily apparent from the following description of some embodiments thereof, given hereafter by way of non limiting indication with reference to the attached drawings, wherein.

DETAILED DESCRIPTION OF PREFERRED EMBODIMENTS

Figure 1:
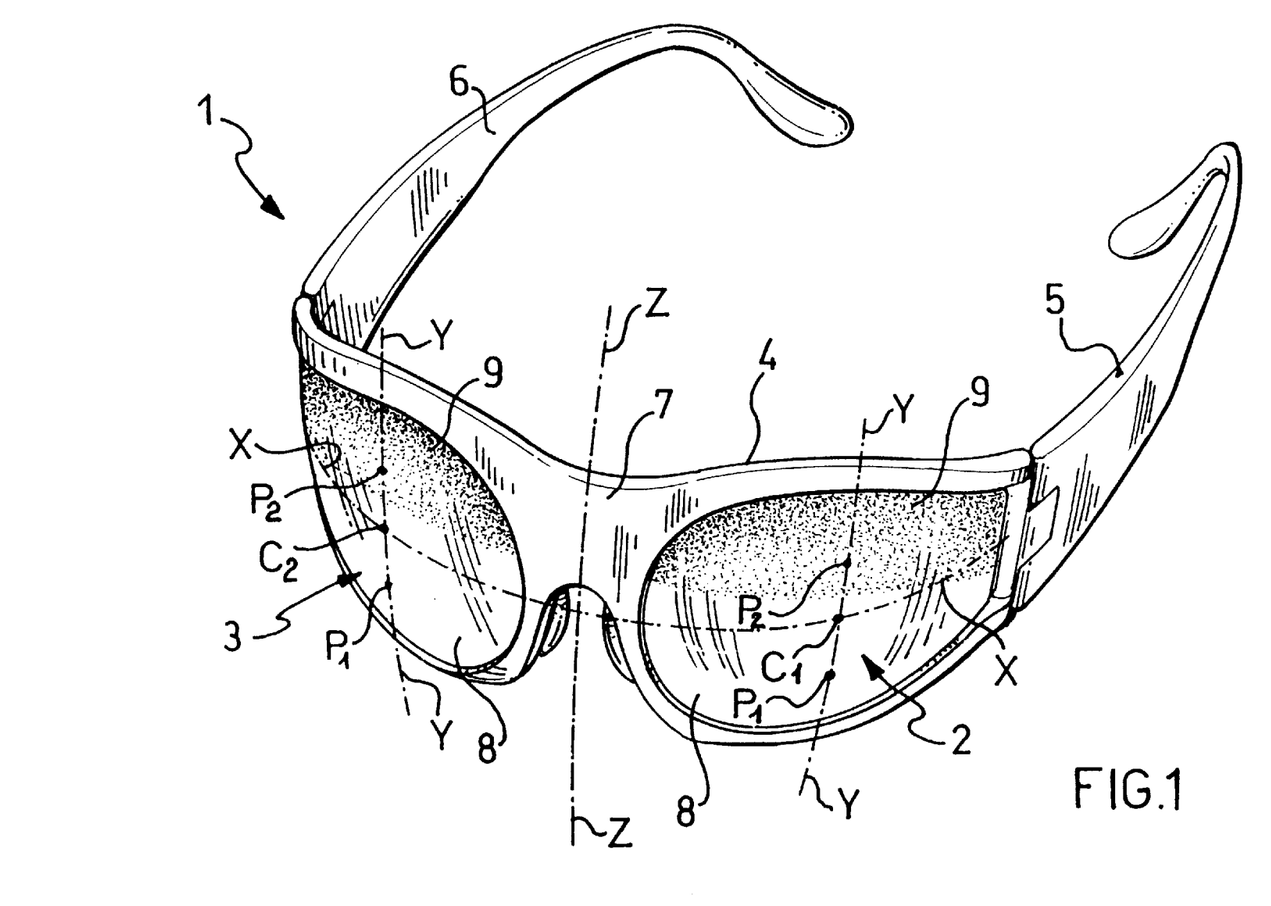
FIG. 1 shows a perspective view of eyeglasses including a couple of lens-shaped optical elements according to the invention.
Figure 2:
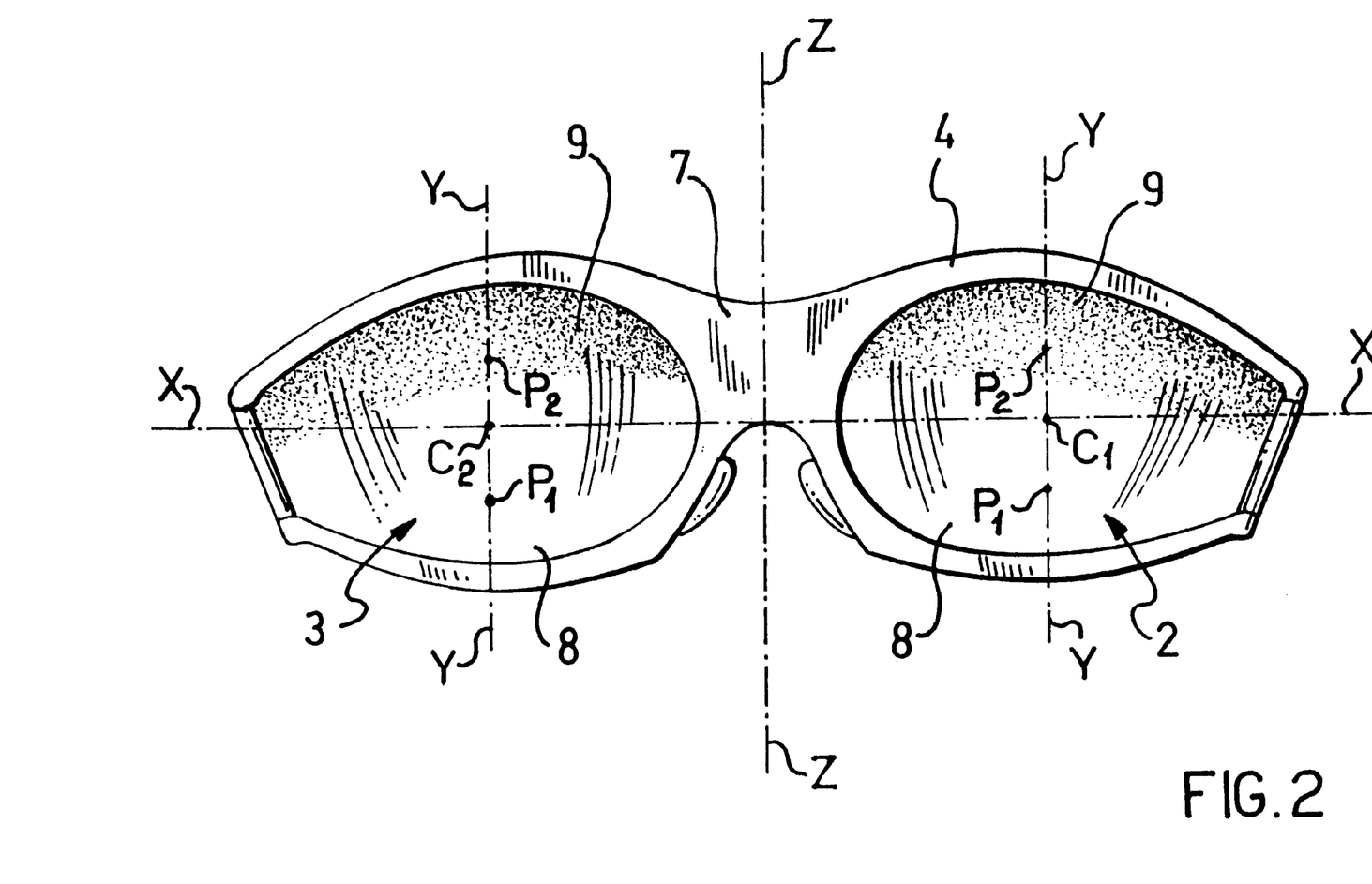
FIG. 2 shows a front elevational view of the eyeglasses of FIG. 1.

With reference to FIGS. 1–2, 1 indicates an eye-protecting device and, more specifically, sports eyeglasses according to the invention, which are especially suitable for golf and clay-pigeon shooting practice as well as for driving vehicles.

Eyeglasses 1 comprise a couple of lenses 2, 3—constituting as many optical elements in the form of oculars according to the invention—conventionally supported by a frame 4 to which two temples 5, 6 are hinged.

The lenses 2, 3, having a specular shape with respect to a vertical symmetry plane z—z passing through the middle of a bridge 7 of the frame 4, may be obtained by means of conventional shaping and beveling operations from a semi-finished product or lens blank having a predetermined bending radius, or by injection molding.

Each one of the lenses 2, 3 comprises a lower portion 8 and an upper portion 9, defined in opposite parts with respect to a median line x—x passing through the geometric centers $C_1$, $C_2$ of each lens.

Within the frame of the present description and the appended claims, the geometry of each lens or, more generally, of each optical element is as defined by European Standard CEN EN 165.

On the basis of such Standard, the geometric center and the median line of the optical element are as defined hereinabove, while the meridian line is the line perpendicular to the median line passing through the geometric center.

In this embodiment of the invention, the spectral transmittance of the lower portion 8 is substantially identical in all the points of the same and is equal to the one measured at a reference point $P_1$ positioned at a distance—along the meridian line y—y of the lenses—of at least 10 mm from the median line.

Preferably, the spectral characteristics of lenses 2 and 3 at reference point $P_1$ are such that:
i) the factor of luminous transmittance is between 40 and 70%,
ii) the curve of spectral transmittance comprises:
  1i) a minimum in the wavelength range of from 495 to 510 nm,
  2i) a progressive increase of the spectral transmittance starting from the minimum of point 1i) up to 700 nm. Concavity changes are admitted provided that they do not give rise to further minimums and maximums in the wavelength range comprised between the point defined under 1i) and 600 nm,
  3i) a maximum at wavelengths lower than 440 nm,
  4i) a progressive increase of the spectral transmittance starting from the minimum defined in point 1i) up to the maximum defined in point 3i). Concavity changes are admitted provided that they do not give rise to further minimums and maximums in the wavelength range comprised between the point defined under 1i) and the point defined under 3i),
  5i) a progressive decrease in the spectral transmittance starting from the maximum of point 3i) down to zero at wavelengths lower than 405 nm.

In this embodiment, both lenses 2, 3 comprise an upper portion having a color shade such that its factor of luminous transmittance progressively decreases moving away from said median line, down to a value not lower than about 3%.

Besides, the optical centers $C_1$ and $C_2$ of lenses 2 and 3 are both located outside of the shaded part and have spectral transmittance characteristics almost identical to those of the lower portion 8, described hereinabove.

Figure 3:
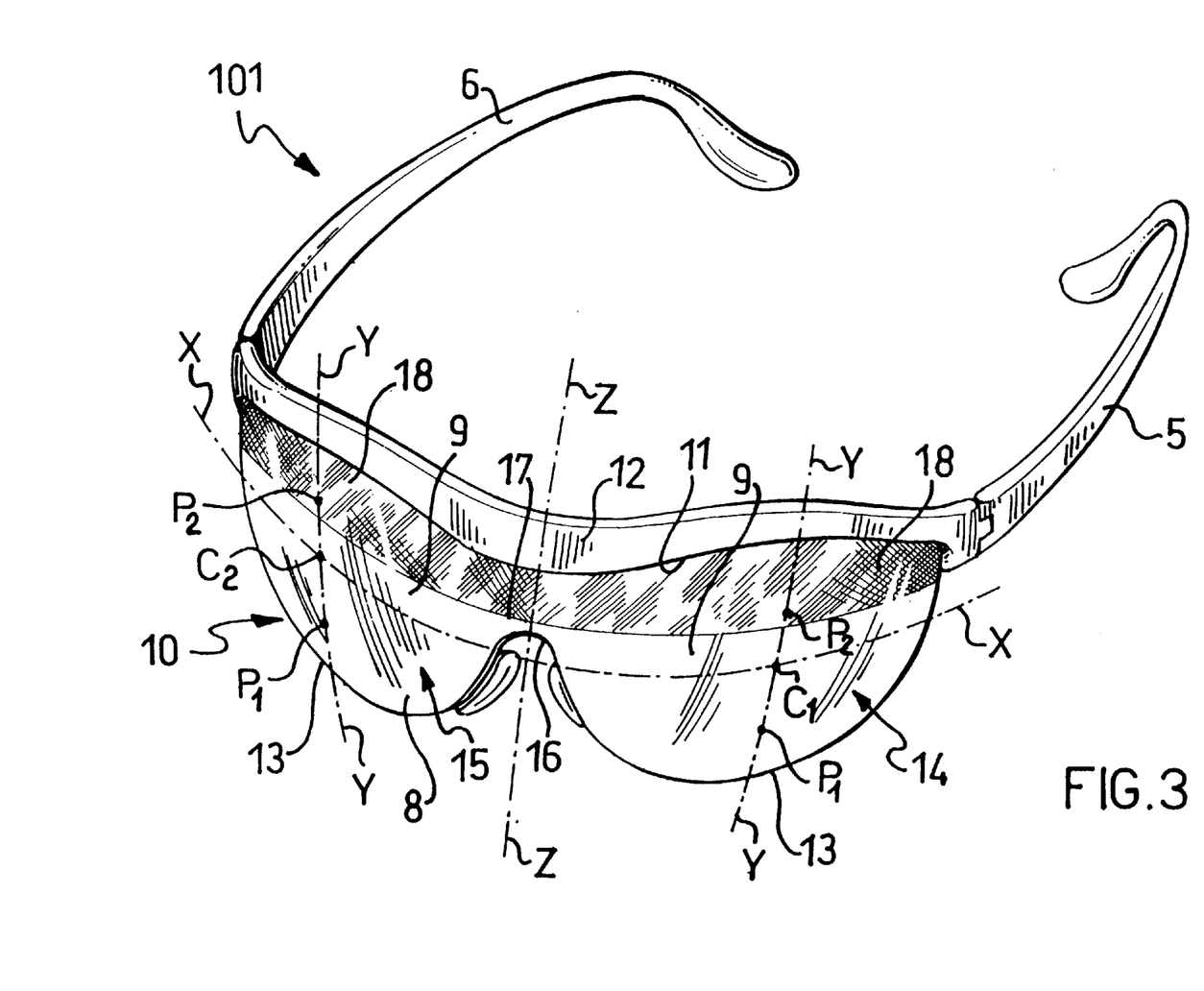
FIG. 3 shows a perspective view of eyeglasses comprising a visor-shaped optical element according to the invention.
Figure 4:
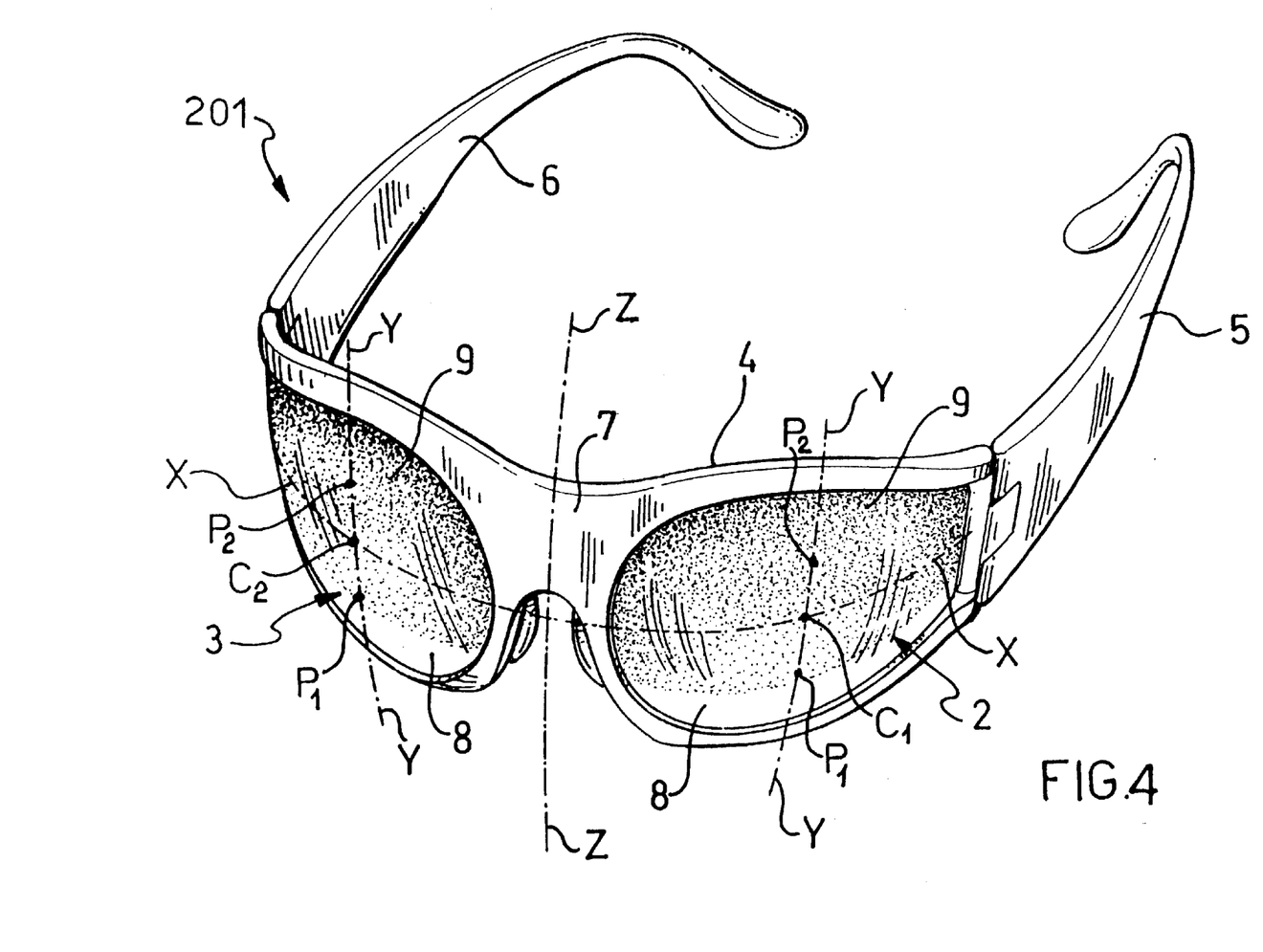
FIG. 4 shows a perspective view of eyeglasses comprising a couple of lens-shaped optical elements according to an alternative embodiment of the invention.

FIGS. 3 and 4 show two further embodiments of the invention and in particular first eyeglasses 101 including as optical element a one-piece visor or mask 10, and second eyeglasses 201 comprising a couple of lenses wherein the color shade extends in part also in the lower portion of the latter.

In the following of description and in such figures, the elements of eyeglasses 101, 201, structurally or functionally equivalent to those illustrated hereinabove with reference to FIGS. 1–2, will be indicated by the same numerals and will be not further described.

In the embodiment shown in FIG. 3, the one-piece mask 10 comprises an upper edge 11, housed in a corresponding mating groove, not shown, formed in a frame 12 of suitable shape.

The one-piece mask also comprises a bottom edge 13 as well as first and second lens portions 14, 15, defined in opposite parts with respect to a groove 16 centrally formed in the lower edge 13.

Said groove 16 defines in this way a bridge 17, integral with said lens portions 14, 15.

Also in this embodiment, both lens portions 14, 15 comprise respective lower 8 and upper 9 portions defined in opposite parts with respect of the median line x—x.

Just like the preceding embodiment, the spectral transmittance of the lower portion 8 is substantially identical in all the points of the same and is equal to that measured in a reference point $P_1$ located at a distance—along the meridian line y—y of the lenses—of at least 10 mm from the median line.

Preferably, the spectral characteristics at reference point $P_1$ are such that:
a) the minimum value of the curve of spectral transmittance located at a wavelength of from 495 to 510 nm is between 20 and 25%,
b) the spectral transmittance is not lower than 85% at a wavelength equal to or higher than 650 nm.

On the other hand, the factor of luminous transmittance of the upper part 9 is substantially identical in all the points belonging to a band 18 (mirror reflecting layer) in which lies the reference point $P_2$ positioned at a distance—measured along the meridian line y—y of the lenses—of at least 10 mm from the median line.

Preferably the factor of luminous transmittance at reference point $P_2$ is between 8 and 20%.

The spectral transmittance of the remaining part of the upper portion 9 outside of the band 18 is, instead, substantially identical to that of the lower portion 8.

In the embodiment shown in FIG. 4, particularly suitable for piloting aircrafts, both lenses 2, 3 of eyeglasses 201 comprise a color shade extending along the whole upper portion 9 and part of the lower portion 8.

Preferably, the factor of luminous transmittance of the upper portion 9 is substantially uniform along lines parallel to the median line x—x and progressively decreases, moving away from a line parallel to the median line and located under point $P_1$, from a value of about 40% down to a value of about 8%.

The optical centers $C_1$ and $C_2$ of lenses 2 and 3 are both located within the shaded off part and at said centers the spectral transmittance falls again within the field of values indicated hereinabove.

Some non limiting examples illustrating the manufacture of an optical element according to the invention will be given by way of indication in the following.

Unless otherwise specified, in such examples the various compositions are defined by indicating the parts by weight of each component.

EXAMPLE 1

20 cap-shaped lens blanks made of diethylenglycol-bis-allyl-carbonate (CR39®) were immersed in an aqueous bath comprising 4 g/l of 4-nitro-2'-methyl-4'-diethanolamino-azobenzene.

The lens blanks were kept immersed for about 15 min, so as to obtain a factor of luminous transmittance of about 50%.

Figure 5:
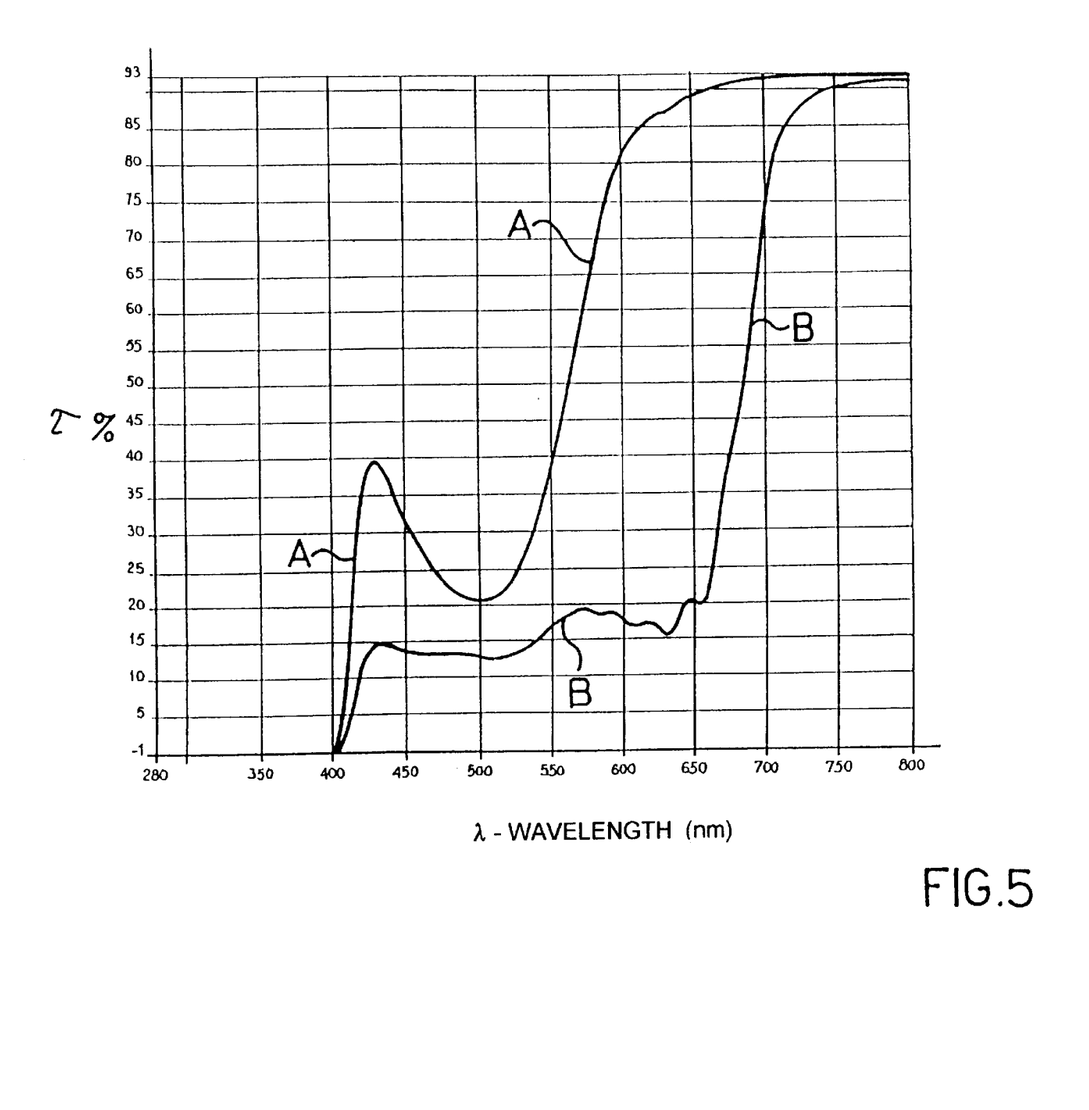
FIG. 5 shows—within a system of Cartesian coordinates having in the abscissa the wavelengths and in the ordinate the spectral transmittance—as many curves of the spectral transmittance of the lower and respectively the upper portion of the lens-shaped optical elements of FIG. 1.

The spectral characteristics at the different wavelengths as measured at a reference point located in the lower portion of the lens blank at a distance of about 10 mm from the median line are illustrated by curve A of FIG. 5.

A part of the upper portion of the so treated lens blanks was afterwards immersed, starting from a distance of about 5 mm from the median line of the same, into a second aqueous bath comprising 2 g/l of 1,4-(1-hydroxyethylamino)-5,8-hydroxy anthraquinone and 2 g/l of 4-acetylamido-2'-hydroxy-5'-methyl azobenzene.

The lens blanks were gradually raised at a speed of 1 mm/min, so as to obtain a treatment intensity increasingly marked towards the upper end of the same.

Depending on the color nuance or shading off so obtained, the factor of luminous transmittance changed from values of from 10 to 20% at a reference point located at about 10 mm above the median line down to values of from 8 to 10% near the upper edge of the lens blanks.

In FIG. 5, curve A graphically shows the spectral transmittance at the untreated part, while curve B shows the spectral transmittance measured at the aforesaid reference point.

EXAMPLE 2

20 cap-shaped lens blanks made of diethylenglycol-bis-allyl-carbonate (CR39®) were immersed in an aqueous bath comprising 4 g/l of 4-nitro-2'-methyl-4'-diethanolamino-azobenzene.

The lens blanks were kept immersed for about 15 min, so as to obtain a factor of luminous transmittance of about 50%.

Figure 6:
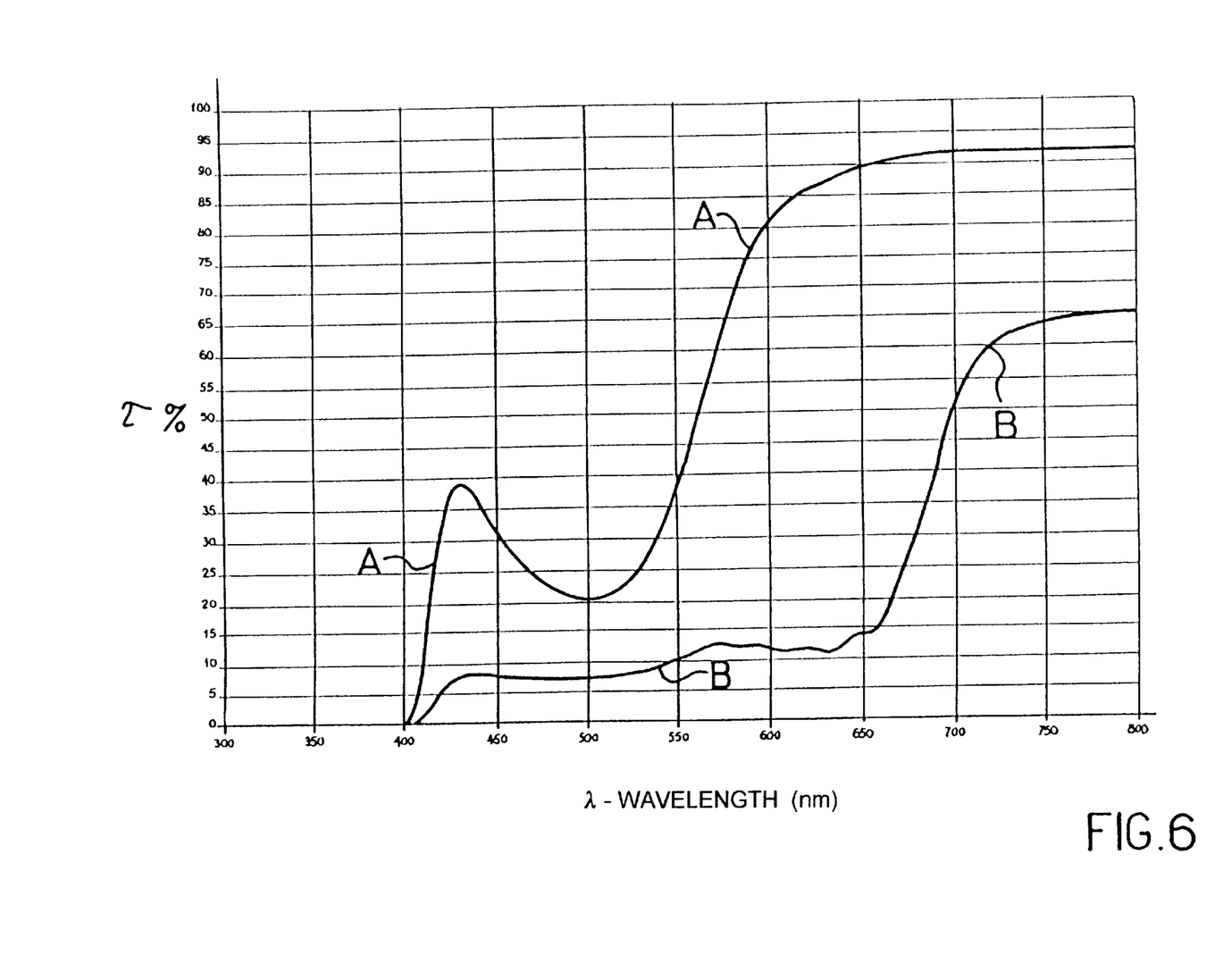
FIG. 6 shows—within a system of Cartesian coordinates having in the abscissa the wavelengths and in the ordinate the spectral transmittance—as many curves of the spectral transmittance of the lower and respectively the upper portion of the visor of FIG. 3.

The spectral characteristics at the different wavelengths as measured at a reference point located in the lower portion of the lens blank at a distance of about 10 mm from the median line are illustrated by curve A of FIG. 6.

A part of the upper portion of the so treated lens blanks was then submitted in a suitable vacuum apparatus to a treatment suitable to deposit a mirror reflecting layer, known in itself, by evaporation of subliming substances, in this case chromium.

As a consequence of this treatment, a chromium layer was obtained having a thickness of about 200 nm, while the factor of luminous transmittance of the so treated part resulted to be uniform and equal to about 10%.

Curve A of FIG. 6 graphically shows the spectral transmittance in the untreated part, while curve B shows the spectral transmittance measured at the part coated by the mirror reflecting layer.

Tests carried out on oculars incorporating different filtering substances and manufactured using other substrates have shown that—whenever the ocular possessed the spectral characteristics describe hereinabove—a substantial increase in the perceptive effectiveness and a substantial reduction in visual straining during the observation of objects alternately against a background having high and respectively low luminosity, was achieved.

Obviously, those skilled in the art may introduce modifications and variants in order to satisfy specific and contingent application requirements, which modifications and variants fall anyhow within the protection scope as is defined by the appended claims.

We claim:

1. An optical element comprising an upper portion and a lower portion, defined in opposite parts with respect to a median line (x—x) passing through the geometric center ($C_1$, $C_2$) of the optical element, wherein:
   a) in the lower portion and at a distance of at least 10 mm from the median line (x—x):
      a1) the factor of luminous transmittance is between 30% and 80%;
      a2) the curve of spectral transmittance as a function of the wavelength is such as to show:
         i) a minimum inflection point in a wavelength range of from 495 to 510 nm,
         ii) an increase in spectral transmittance at wavelengths lower than 495 nm and higher than 510 nm,
         iii) a maximum inflection point at a wavelength lower than 440 nm,
         iv) a reduction in the spectral transmittance as the wavelength decreases starting from said maximum;
   b) in the upper portion and at a distance of at least 10 mm from the median line (x—x):
      b1) the factor of luminous transmittance is between 3% and 40%.

2. The optical element according to claim 1, wherein the ratio between the factor of luminous transmittance of the lower portion and the factor of luminous transmittance of the upper portion is between 1.5 and 7.

3. The optical element according to claim 1, wherein the spectral transmittance at said minimum inflection point is between 15 and 25%.

4. The optical element according to claim 1, wherein the spectral transmittance at said maximum inflection point located at a wavelength lower than 440 nm is between 35 and 45%.

5. The optical element according to claim 1, wherein the spectral transmittance of the lower portion at a distance of at least 10 mm from the median line (x—x) is not lower than 85% at a wavelength equal to or higher than 650 nm.

6. The optical element according to claim 1, wherein in the upper portion and at a distance of at least 10 mm from the median line (x—x) the factor of luminous transmittance is between 8% and 20%.

7. The optical element according to claim 1, wherein at the geometric center ($C_1$, $C_2$):
   a1) the factor of luminous transmittance is between 30% and 80%;

a2) the curve of spectral transmittance as a function of the wavelength is such as to show:
   i) a minimum inflection point in a wavelength range of from 495 to 510 nm,
   ii) an increase in spectral transmittance at wavelengths lower than 495 nm and higher than 510 nm,
   iii) a maximum inflection point at a wavelength lower than 440 nm,
   iv) a reduction in the spectral transmittance as the wavelength decreases starting from said maximum.

8. The optical element according to claim 1, wherein the factor of luminous transmittance is between 3% and 40% along the median line (x—x).

9. The optical element according to claim 1, wherein the factor of luminous transmittance of said upper portion is substantially uniform and progressively decreases moving away from said median line (x—x) down to a value not lower than 3%.

10. The optical element according to claim 1, wherein the factor of luminous transmittance of the whole upper portion is substantially uniform in each point of the same.

11. The optical element according to claim 1, wherein the factor of luminous transmittance of said lower portion is substantially uniform starting from a distance of at least 10 mm from the median line (x—x).

12. The optical element according to claim 7, wherein the factor of luminous transmittance of said lower portion is substantially uniform starting from said median line (x—x).

13. The optical element according to claim 1, wherein the spectral transmittance is substantially null at a wavelength equal to or lower than 400 nm.

14. The optical element according to claim 2, said upper and lower portions are formed by a substrate made of one of transparent plastic material and glass.

15. The optical element according to claim 14, wherein said substrate made of transparent plastic material is selected from the group comprising: polymethyl methacrylate, polyol-allyl-carbonates, aromatic polycarbonates, polystyrene, cellulose esters, polyacrylates, polyalkylacrylates, polyurethanes, saturated and unsaturated polyesters, transparent polyamides, and mixtures thereof.

16. The optical element according to claim 14, wherein said lower portion comprises at least a substance suitable to filter the visible light and comprising azobenzene or anthraquinone chromophore groups.

17. The optical element according to claim 16, wherein said substance suitable to filter the visible light is selected from the group comprising: 4-nitro-2'-methyl-4'-diethanolamino azobenzene, 1-amino-2-phenoxy-4-hydroxy anthraquinone, 2-chloro-4-nitro-2'-methyl-4'-(1-cyanoethylethylamino) azobenzene, and mixtures thereof.

18. The optical element according to claim 14, wherein said upper portion comprises in combination:
   a) a first substance adapted to filter the visible light and comprising azobenzene or anthraquinone chromophore groups, and
   b) a second substance adapted to filter the visible light and comprising azobenzene or anthraquinone chromophore groups such that the factor of luminous transmittance is comprised between 3 and 40%.

19. The optical element according to claim 18, wherein said first substance suitable to filter the visible light is selected from among the group comprising: 4-acetylamido-2'-hydroxy-5'-methyl azobenzene, N-(p-hydroxyphenyl)-2,4-nitroaniline, and mixtures thereof.

20. The optical element according to claim 18, wherein said second substance suitable to filter the visible light is selected from among the group comprising: 1,4-(1-hydroxyethylamino)-5,8-hydroxy anthraquinone, 1-(p-hydroxyethylanilino)-4,5-hydroxy-8-nitro anthraquinone, 1-methylamino-4-hydroxyethylamino anthraquinone, and mixtures thereof.

21. The optical element according to claim 2, wherein said optical element has a form of a semi-finished product for the manufacture of oculars.

22. The optical element according to claim 21, wherein said optical element has a form of an ocular.

23. The optical element according to claim 22, wherein said ocular comprises a lens for eyeglasses.

24. The optical element according to claim 22, wherein said ocular comprises one of a visor, a protection mask and a portable screen.

25. The optical element according to claim 24, wherein said visor comprises an upper edge, a lower edge, as well as first and second lens portions formed on opposite parts of a groove centrally formed in said lower edge.

26. The optical element according to claim 2, wherein said optical element has a form of a filter for photographic applications.

27. An eye-protecting device comprising an optical element according to claim 22.

* * * * *